United States Patent [19]

Werthaiser et al.

[11] 4,144,294

[45] Mar. 13, 1979

[54] METHOD OF CONDITIONING GARNETED POLYESTER FOR BLOW INJECTING AS INSULATION IN GOODS, AND APPARATUS THEREFOR

[76] Inventors: Martin S. Werthaiser, 4426 S. Fraser Ct., Denver, Colo. 80232; Paul L. Legoski, 1261 Syracuse, Denver, Colo. 80220

[21] Appl. No.: 848,574

[22] Filed: Nov. 4, 1977

[51] Int. Cl.[2] .............................................. B29C 23/00

[52] U.S. Cl. ...................................... 264/15; 264/115; 264/119

[58] Field of Search .................. 264/15, 115, 140, 119

[56] References Cited

U.S. PATENT DOCUMENTS

| | | | |
|---|---|---|---|
| 3,892,909 | 7/1975 | Miller | 428/371 |
| 3,923,942 | 12/1975 | Nishiumi | 264/91 |

*Primary Examiner*—Robert F. White

*Assistant Examiner*—James R. Hall

*Attorney, Agent, or Firm*—Crandell and Polumbus

[57] ABSTRACT

Sheets of garneted polyester are separated into a plurality of small pieces and each of the small pieces is generally formed into a rounded body suitable for blow injecting into an insulation receiving pocket formed in goods such as coats, sleeping bags and the like, in accordance with the method and apparatus provided. The rounded bodies formed may generally be used similarly to and as a substitute for natural down insulation. The rounded bodies formed are approximately uniform in size and weight, and the size of each of the bodies is sufficiently small to avoid clogging of the blow injecting tubes and paths of the apparatus utilized in filling the goods with insulation. Each of the rounded bodies include a plurality of randomly oriented polyester fibers therein, and each of the rounded bodies provides a substantial resiliency to permanent deformation after the application of force to them.

20 Claims, 6 Drawing Figures

METHOD OF CONDITIONING GARNETED POLYESTER FOR BLOW INJECTING AS INSULATION IN GOODS, AND APPARATUS THEREFOR

FIELD OF THE INVENTION

This invention relates to conditioning garneted polyester or synthetic fiber material for the purpose of effectively blow injecting the material into insulation receiving pockets formed in goods such as coats, vests, sleeping bags and the like during the manufacture of these goods. By the present invention, garneted polyester material may be used as an effective substitute for natural down as insulation in these types of goods.

BACKGROUND OF THE INVENTION AND BRIEF DESCRIPTION OF PRIOR ART

Natural down is recognized as a highly desirable insulating medium for various goods such as clothes and sleeping bags. Its excellent insulating characteristics result from the loft or the interlocking of the down and feathers when it is collected as a body. The loft creates dead air space between the down and feathers, and the trapped air provides insulating characteristics which are highly effective under a wide range of temperatures. After prolonged use, the down retains its loft and stays in a fluffy condition without matting, collecting together or condensing. When compressed or deformed, the down will generally return to its original position. Because the down links together and does not lose its loft, the exterior appearance of the goods is smooth and soft to the touch.

Using natural down as insulation in goods also provides significant advantages during manufacturing of the goods. The feathers comprising the down are relatively light in weight and can easily be transported and carried in airstreams. As a consequence, when the goods are manufactured, the down can be readily blow injected in an airstream into insulating pockets sewn into the goods for the purpose of receiving the down. It is therefore relatively easy for the manufacturer to sew the insulating pockets, quickly inject them with a desired weight or volume of down and thereafter close the pockets to permanently retain the quantity of down therein.

Presently, the major disadvantages of natural down are its cost and its availability. Various synthetic materials have been developed and utilized as alternatives to down, but in the past, none of the synthetic fiber materials have achieved substantially all of the desirable features of down.

In the past, the most advantageous form for using synthetic or polyester fibers as insulating material has been in a garneted sheet. Garneted sheets are formed by first cutting individual fibers of extruded polyester material into specific desired lengths. Thereafter, the cut lengths are crimped or formed with a repeating S-shaped curve. The crimped lengths or staples are thereafter placed in a layer and the fibers of the crimped staples are disoriented until they interlink or overlap with their adjacent fibers. Thereafter, the layer of interlinked crimped fibers are sprayed with a resin material to connect the fibers at their points of contact. In this manner, the fibers are essentially held together as a relatively uniform layer of material having essentially the same density throughout. The myriad of interlinked fibers creates the dead air space which provides the insulating characteristic of the garneted material. The sheet of material retains its resiliency to deformation because of the connection of the interlinked fibers. After garneting, the sheets of material are rolled into rolls suitable for shipping.

The layers of garneted polyester material are assembled into goods by cutting one or more layers of the material in a desired shape and sewing the layers between two sheets of material from which the goods are made. This cutting and sewing process is relatively time consuming and can be somewhat awkward to accomplish when manufacturing the goods. The layers of garneted material do not always remain properly positioned within the pocket after use since the layers of material may shift somewhat or the edges may move somewhat, leaving the periphery of the pocket relatively free of insulation and creating a roughened exterior appearance in the goods.

Blow injecting sheets of garneted polyester material, or pieces torn from the sheets, has not been effectively achieved. The pieces torn from the sheets readily clog the tubes of the blow injection apparatus, and in general, create problems relating to accurately filling the insulation receiving pockets, securing a desired appearance and feel, and maintaining resiliency.

Polyester fibers can also be used in an ungarneted state as insulation. Ungarneted fibers are those which have been cut to the desired lengths and possibly crimped, but they are not connected in an interlinked manner in a layer or in any other configuration. Essentially, the staples are randomly loose. Ungarneted fibers do not provide significant loft or resiliency but instead lump and mat together and do not maintain a desired initial shape. Many other naturally occuring fibers such as cotton fibers, wool fibers and the like are also subject to the same disadvantages as ungarneted synthetic fiber material. For these reasons, ungarneted polyester fibers are generally not used in average quality or high quality goods.

The advantages of blow injecting polyester fiber material has been recognized in the prior art. This recognition, however, extends primarily to the shape of bodies of material which are first formed from ungarneted polyester fiber material and thereafter are sprayed with a bonding material to retain the shape. Since this procedure does not relate to the use of garneted polyester, it is undesirable for a number of reasons. The typical garment manufacturer is unable to produce or form bodies suitable for blow injecting since formation according to the prior art requires the use of many complicated procedures, such as the capabilities for forming ungarneted fibers into the desired bodies and for thereafter spraying them with resin material. Such capabilities usually require the use of expensive machinery.

It is usually more desirable for a manufacturer to obtain and work with garneted polyester material which has previously been formed in rolled sheets, since the rolls are more efficiently and economically transported and utilized. The garment manufacturer may also wish to blow inject a particular type of polyester fiber but selection is not possible if only a particular type of polyester has been pre-formed in bodies suitable for blow injecting.

The described features of the prior art relative to blow injecting insulating material in goods generally set forth a background for understanding the importance and significance of the present invention. It will be appreciated, however, that the various limitations, considerations and disadvantages present in the prior art can be more fully appreciated and recognized in light of the improvements and teachings of the present invention which is described next.

SUMMARY OF THE INVENTION

An appreciation for the present invention can be obtained by understanding its general objective, which is to provide a method and apparatus for changing sheets of garneted polyester fiber material into a condition or configuration suitable for blow injecting into an insulation receiving pocket of manufactured goods. Other objectives in relation to goods of this type are to maintain effective dead air spaces within the polyester material, to maintain the loft or resiliency of the polyester material, and to maintain polyester fiber material as a unit in the pocket after it has been blow injected. Other objects are to change the sheets of garneted polyester into a suitable condition for achieving consistency and accuracy in the measurement of quantity or weight of insulating material blow injected into the pockets, and for obtaining the look and feel of down after it has been received in the goods. In general, the overall objective of the present invention is to effectively substitute garneted polyester material for natural down in goods and obtain essentially the same advantages as those obtained from natural down.

In accordance with its general aspects, the present invention relates to a method for separating at least one segment of garneted polyester fiber material into a plurality of small pieces and forming the small pieces into bodies generally suitable for blow injecting into an insulation receiving pocket in insulated goods. The small pieces of garneted polyester material are formed into generally rounded bodies with the fibers therein being randomly oriented to provide a substantial resiliency to permanent deformation. The rounded bodies are generally formed by impacting the garneted pieces onto a plurality of projection members defining spaces therethrough and thereafter drawing at least a few of the pieces of polyester material through the spaces. The pieces of polyester material may be agitated, rolled and tumbled to aid in the formation of the rounded bodies. The procedure is continued until all of the pieces are generally transformed into bodies of uniform size. Many of the aforementioned steps are achieved by apparatus including a blade member having a plurality of projection members extending therefrom which is moved in a path juxtaposted to a plurality of spaced-apart and stationarily positioned projection members. A plurality of blade members are formed as a part of a reel member, and the stationarily positioned projection members may be positioned within the interior of a U-shaped container which receives the reel member. Rotation of the reel member changes the sheets of garneted polyester material into pieces and forms the pieces into the rounded bodies.

A more complete understanding of the invention can be obtained from the appended claims, and from a description of a presently preferred embodiment of the invention taken in conjunction with a drawing consisting of a number of figures.

BRIEF DESCRIPTION OF PREFERRED EMBODIMENT

Figure 1:
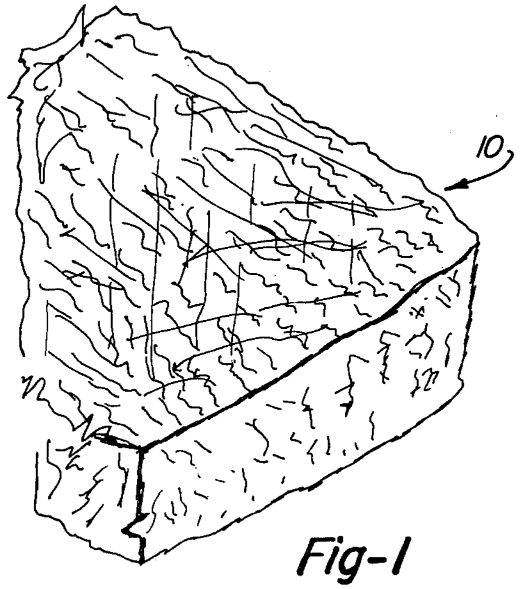
FIG. 1 is a perspective view of a portion of a sheet or segment of garneted polyester or synthetic fiber material with which the present invention is utilized.
Figure 2:
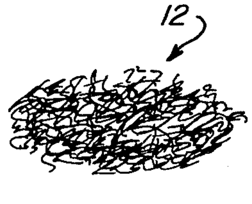
FIG. 2 is a general perspective view of one form of a rounded body formed in accordance with the concepts of the present invention and formed from the garneted polyester fiber material illustrated in FIG. 1.

The general concepts of the present invention relate to changing segments or sheets 10 of garneted polyester or synthetic fiber material shown in FIG. 1 into rounded bodies 12 shown in FIG. 2. The rounded bodies formed are suitable for blow injecting as insulation into insulation receiving pockets formed in insulated goods such as coats, jackets, sleeping bags and the like. Each sheet 10 is separated into a plurality of small pieces, and the small pieces are formed into the rounded bodies 12. Apparatus suitable for performing these and other functions involved in changing the garneted polyester fiber material into the rounded bodies is illustrated in FIGS. 3, 4, 5 and 6.

The sheet 10 of garneted polyester fiber material illustrated in FIG. 1 is conventional and known in the art. The sheets 10 or other segments are typically formed by the manufacturer of the synthetic fibers and are shipped to the manufacturer of the insulated goods for use. The garneted polyester fiber material is typically formed in sheets, and the sheets rolled into large rolls for purposes of convenience in storage, transportation and utilization.

The rounded bodies 12, illustrated in FIG. 2 and formed in accordance with the concepts of the present invention, may take on a variety of appearances. Typically, the bodies 12 will have a rounded exterior, and will appear somewhat spherical or somewhat oblong or oval shaped. After being formed in accordance with the invention, the fibers of each of the bodies 12 are randomly oriented and some of the ends of the fibers project outwardly from the general exterior surface of the body 12. The randomly oriented fibers provide or exhibit a substantial resiliency to permanent deformation and prevents the fibers from matting together and loosing the loft attributed to the randomly oriented fibers. Because of this configuration, the bodies 12 retain their resiliency to permanent deformation upon the application of force thereto in much the same manner as natural down. The projection of the fiber ends from the exterior allows a group of the bodies to be readily linked and held together by interconnection of the projecting fiber ends. When interconnected, the collective group of bodies 12 within the insulation receiving pocket provide a collective loft and resiliency and provide the look and feel of natural down within the goods.

The preferable size of each of the bodies 12 is such that the profile of each body is generally of approximately the same area as an American twenty-five cent coin. This size allows the bodies 12 to be readily blow injected into the insulation receiving pockets formed in goods. To effectively blow inject the bodies 12, their size must not be so large as to clog or obstruct the conduits, tubes and other blow path defining means in conventional blow injecting apparatus. If the bodies 12 are too large, they have a tendency to clog the blow paths of the blow injecting machinery, and they do not provide the desired amount of collective loft when received within the insulation receiving pocket. Formation of bodies 12 too small in size separates too many of the linked fibers in the garneted fiber material and provides an undesirable effect somewhat similar to ungarneted material.

Preferably, a number of sheets 10 of garneted polyester material are simultaneously acted upon to form a relatively large number of the rounded bodies 12 in one operation. The process of separating the sheets 10 into pieces and forming the pieces into rounded bodies continues until all the rounded bodies are of generally uniform size and weight. Being uniform in weight allows accurate and consistent measured amounts of the bodies 12 to be blow injected into the insulation receiving pockets. Consistency in the fill or the amount of material injected into the pocket is important in insuring that the correct amount of insulation is placed in the goods at specific and desired locations. Consistency of fill is also important in avoiding an uneven and distorted external appearance in the manufactured goods. One exemplary form of apparatus 20 illustrated in FIGS. 3 through 6 can be used to form the sheets 10 of garneted polyester fiber material into the rounded bodies 12 having the characteristics described.

Figure 3:
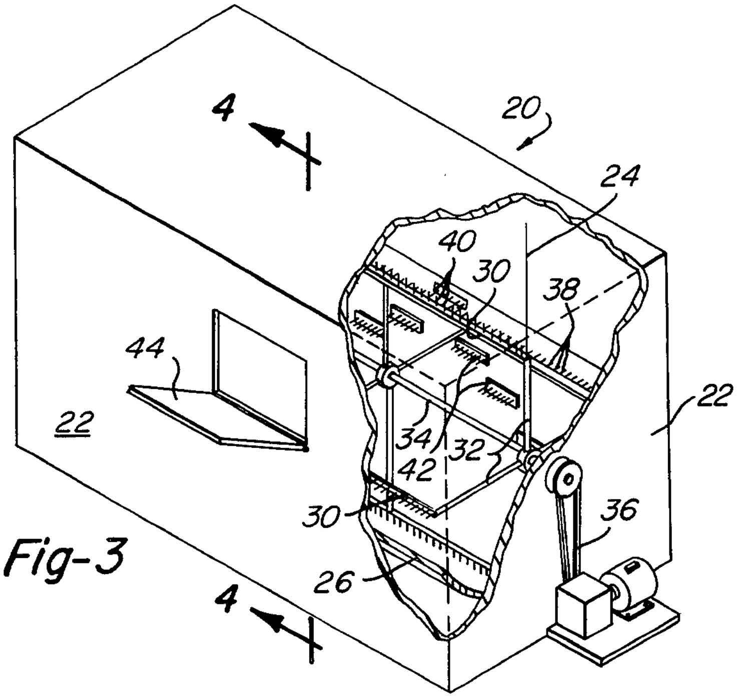
FIG. 3 is a perspective view of one form of apparatus which may be utilized to practice the concepts of the present invention, with certain portions being broken away for purposes of clarity of illustration.
Figure 4:
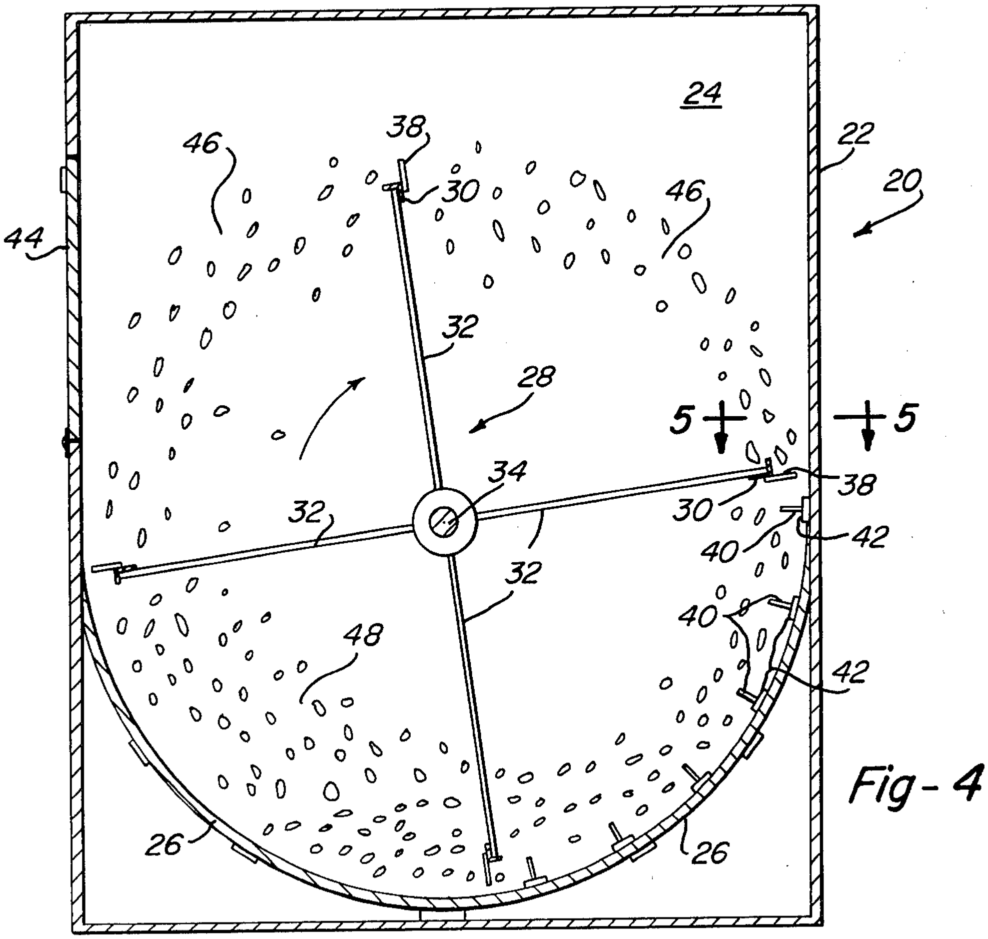
FIG. 4 is an enlarged section view taken substantially in the plane of line 4—4 of FIG. 3.

Referring now to FIGS. 3 and 4, the apparatus 20 includes an outer housing 22 formed as a closed rectangular structure having a hollow interior 24. A curved bottom wall 26 of the interior 24 is shaped in the manner of a half cylinder, and thereby defines the interior 24 in the form of a U-shaped container. It is in the interior 24 that the sheets 10 of garneted polyester fiber material are transformed into the rounded bodies 12. Positioned for rotation within the interior portion 24 is a reel member 28. The reel member includes a plurality of blade members 30 attached at the outer radial ends of radially extending arms 32. The arms 32 are rigidly attached to a center shaft 34 extending through the housing 20. The reel member 28 is rotated as a result of a rotating force applied by means of a conventional electric motor and belt drive 36. As the reel member 28 rotates, its blade members 30 move in a path juxtaposed to the curved bottom wall 26.

A plurality of spaced-apart finger members 38 are attached to the blade members 30 and project radially outward therefrom. The space between adjacent finger members 38 is preferably uniform. Extending radially outward, the finger members 38 pass in close proximity to the curved bottom wall portion 26, but do not contact the bottom wall.

Positioned stationarily on the curved bottom wall 26 are a plurality of finger members 40. Each of the finger members 40 extend essentially normally from the wall 26 where it is attached. The finger members 40 are positioned in a spaced-apart relation with respect to one another and are positioned from one another in aligned rows, preferably at equal intervals. The finger members 40 are arranged in segments 42. The finger members 40 of each segment 42 are preferably aligned in a row in that segment.

Figure 6:
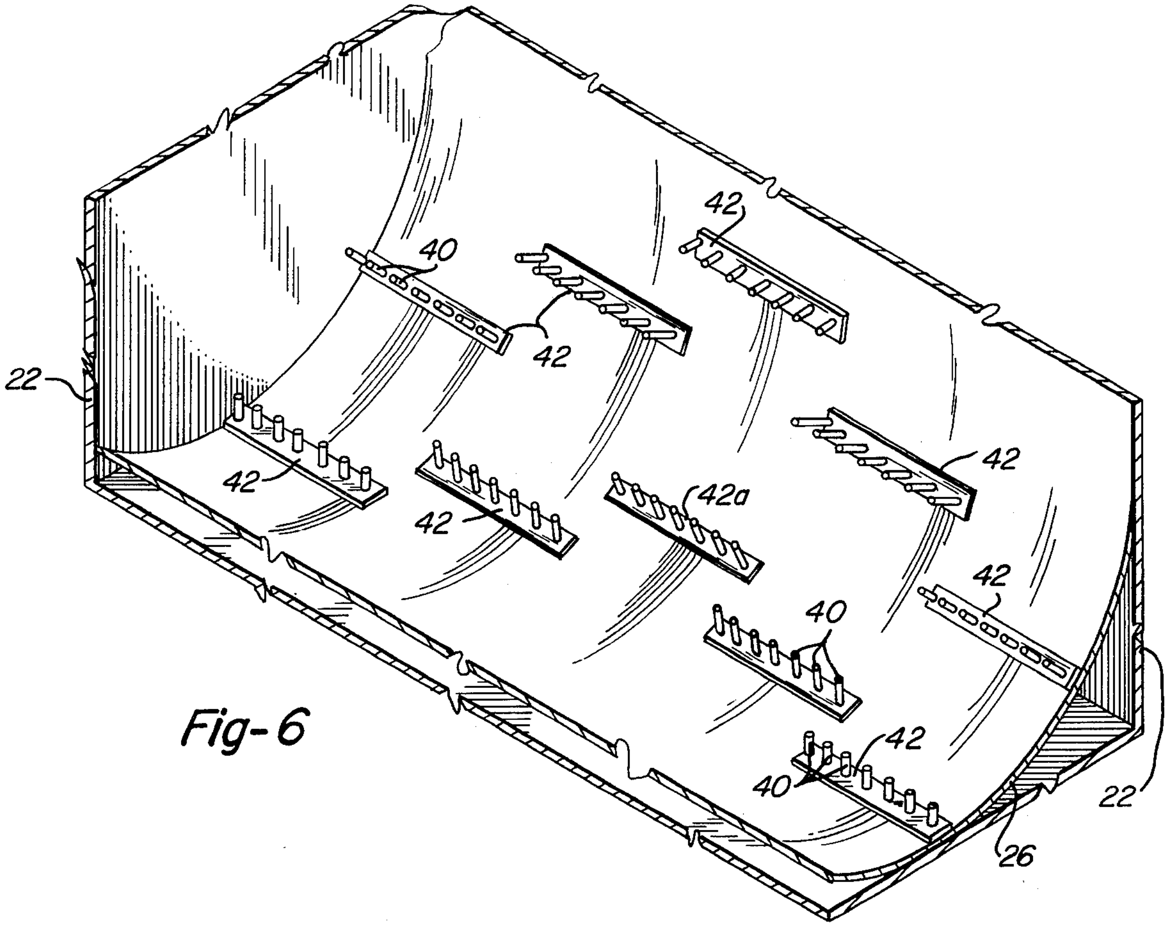
FIG. 6 is an enlarged perspective view of a portion of FIG. 3 with certain elements removed for clarity and illustrating a plurality of stationarily positioned projection or finger members located within the interior of the apparatus.

The finger members 40 are preferably positioned on the curved wall 26 to define at least one V-shaped configuration. The position of the segments 42 defines each V-shaped configuration, as is best illustrated in FIG. 6. Preferably, two V-shaped configurations are employed on one half of the cylindrically curved wall 26, preferably upon the first half of the curved wall 26 over which the blade members 30 pass during rotation of the reel member. Shown in FIG. 4, the reel member 28 rotates clockwise, and therefore the finger members 40 are positioned on the right-hand half of the curved wall 26 since the blades 30 move past the right-hand half prior to moving past the left-hand half of wall 26. The point of each V-shaped configuration, defined for example by segment **42*a* in the lower V-shaped configuration shown in FIG. 6, is positioned whereby the blade members 30** move past the point of the V-shaped configuration prior to moving past the remaining portion of the V-shaped configuration.

Figure 5:
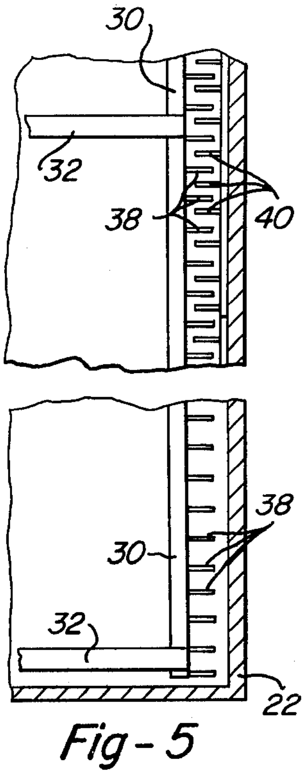
FIG. 5 is a section view taken substantially in the plane of line 5—5 of FIG. 4 with certain portions broken out.

As is best shown in FIG. 5, the length of each of the stationarily-positioned finger members 40 is sufficiently short to slightly avoid contact with the blade member 30 as it traverses a path juxtaposed to the curved wall 26. The space between adjacent finger members 38 and the space between the adjacent finger members 40 is preferably the same. The finger members 40 are positioned on the curved wall 26 to extend into the spaces between the spaced-apart finger members 38 on the blade members 30 as the reel member 28 rotates. Corresponding finger members 38 are positioned at approximately the same axial locations on each of the blade members 30, and consequently, corresponding finger members of the blade members rotate within planes perpendicular to the axle shaft 34. By this arrangement, each of the finger members 38 on any of the blades moves within the space between the stationarily positioned finger members 40.

Sheets 10 of garneted polyester fiber material are loaded into the hollow interior 24 of the apparatus 20 by operation of a blower (not shown) connected to the top wall of the housing 22. A door (also not shown) is provided at an end wall of the housing 22 adjacent the bottom portion of the curved wall 26. The blower is started and air is pulled through the door and into the interior 24, and this airflow pulls sheets of garneted polyester into the interior of the apparatus. A door 44 is provided on a side wall of the housing 22 for the purpose of observing the action within the interior 24 if desired.

Once the sheets of garneted polyester fiber material are within the interior of apparatus 20, the moving projecting members 38 and stationarily-positioned projecting members 40 cooperate to separate the sheets of material into a plurality of small pieces. The finger members 38 extend into the garneted material, and the pieces of material are transported to the stationarily-positioned finger members 40 by rotation of the reel member 28. As the finger members move past between one another, the pieces are drawn and forced through the spaces between the finger members to separate the pieces and round them into bodies 12.

The reel member rotates sufficiently fast to establish a flowstream 46 of the small pieces of material to the stationarily positioned finger members 40, as is shown in FIG. 5. The pieces in the flowstream 46 are separated and carried in an airstream between the individual blade members 30 due to rotation of the reel member. The pieces in the flowstream 46 and carried by the finger members 38 are impacted upon the stationarily positioned projection members 40. The impact has the effect of further separating larger pieces of material and also forming the pieces into the rounded bodies 12. The process generally continues until all of the larger pieces of garneted polyester fiber material have been separated into smaller pieces and the smaller pieces have been formed into the rounded bodies.

As the pieces in the flowstream 46 are impacted upon the stationarily positioned finger members 40, they tend to move laterally along the legs of each V-shaped configuration. As a result, the pieces of material and the bodies 12 tend to roll toward the ends of the apparatus 20 with a rolling movement generally perpendicular or transverse with respect to the movement of the rotating finger members 38. The rolling movement along the V-shaped configuration toward the ends of the housing 22 and the rotating movement of the fingers 38 induce a random tumbling of the pieces and bodies as they are formed and round the bodies.

After the pieces have been moved past the two V-shaped configurations, a collection 48 of pieces and bodies occurs on the left-hand half of the curved wall 26 as shown in FIG. 4. The collection 48 is agitated by the passage of the blade members through the collection, and a number of the bodies and pieces within the collection are lifted and moved into the flowstream 46. The agitation of the collection 48 induces tumbling of the pieces and further aids in the formation of the rounded bodies. Many of the rounded bodies in the collection 48 will remain there after having been reduced to the desired size, although a certain number of the rounded bodies 12 will always comprise a portion of the flowstream 46. However, the larger pieces within the collection 48 are eventially contacted by the moving finger members 38 and lifted from the collection into the flowstream 46 where they are impacted upon the stationarily positioned finger members 40 and drawn through the spaces between finger members.

The aforementioned operation continues until substantially all of the pieces of garneted polyester material have been formed into the rounded bodies 12. Once all of the pieces have been formed into rounded bodies of essentially uniform size, operation of the apparatus 20 is terminated and the accumulation of rounded bodies 12 is removed from the apparatus 20 by conventional means.

An apparatus 20 constructed substantially in compliance with the following details is provided as one example of the present invention. The length of the finger members 38 and 40 was fixed at approximately two inches, and the overlap of the finger members in the spaces with respect to one another was approximately 1.25 inches. The diameter of the reel member 28 from the outer projecting ends of the finger members was fixed at 58 inches. The length of the segments 42 was approximately 24 inches. The length and width of the interior 24 of the housing 22 was fixed at eight feet and five feet, respectively. The reel member 28 was rotated at approximately 45 revolutions per minute. Approximately fifty to sixty pounds of DuPont Dac II garneted polyester having staple lengths of 1.13 inch or 0.97 inch was loaded into the apparatus 20 and operated thereon in accordance with the concepts of the invention for approximately 5 to 10 minutes. At the end, the garneted polyester fiber material had been transformed into the bodies 12. The bodies thus formed were suitable for blow injecting into insulation receiving pockets formed in manufactured goods, and presented no problem with clogging or otherwise inhibiting the good operation of the blow injecting apparatus. The size of the bodies 12 allowed accurate measurement of the weight of the bodies 12 introduced into the insulation receiving pockets. Once received within the pockets, the collective group of bodies 12 provided good loft and resistance to permanent deformation, provided a smooth external appearance in the material from which the manufactured goods were formed, and generally had the look and feel of natural down.

It is apparent that the concepts of the present invention readily allow segments of garneted polyester material to be changed into a condition which may be effectively blow injected into insulation receiving pockets formed in manufactured goods. In general, the primary advantage of the present invention is that garneted polyester material can be utilized as an effective and economical substitute for natural down.

Although the present invention has been described with a certain degree of particularity and one specific example provided, it is understood that the present disclosure has been made by way of example, and that certain changes may be made from this description without departing from the spirit and scope of the invention as set forth in the appended claims.

We claim as our invention:

1. A method of changing sheet-like segments of garneted polyester fibers into rounded bodies suitable for blow injecting through a blow injection path as insulation into a pocket formed in goods for receiving the insulation, comprising the steps of:

providing at least one segment of garneted polyester fiber material, separating each segment of garneted polyester fiber material into a plurality of smaller pieces, and forming each of the small pieces into a generally rounded body, each of the rounded bodies being generally uniform in weight and size, the size of each of the rounded bodies being suitable for blow injecting into an insulation pocket without clogging the blow injection path, and each of the rounded bodies having randomly oriented polyester fibers therein, and each of the rounded bodies exhibiting substantial resiliency to permanent deformation.

2. A method as recited in claim 1 wherein each body formed includes a plurality of polyester fibers projecting randomly outward from the outer surface thereof.

3. A method as recited in claim 1 wherein the step of forming each of the plurality of pieces into generally rounded bodies further comprises the step of:

providing a plurality of stationarily positioned and spaced-apart finger members, and forcing pieces in a movement path through the space between the finger members.

4. A method as recited in claim 3 further comprising the step of:

randomly agitating the pieces.

5. A method as recited in claim 4 wherein the step of agitating th pieces occurs after the pieces have been forced through the space between the finger members.

6. A method as recited in claim 5 further comprising the step of:

tumbling the pieces generally laterally with respect to the movement path of the pieces through the space between finger members.

7. A method as recited in claim 1 comprising the further steps of:

accumulating a number of the pieces in a collection,
removing a number of the pieces from the collection,
providing a plurality of spaced-apart and stationarily positioned finger members, and
drawing at least a few of the pieces removed from the collection through the space between the finger members.

8. A method as recited in claim 7 wherein the step of removing a portion of the pieces from the collection comprises the steps of:

establishing a flowstream of pieces from the collection, and
transporting the pieces in the flowstream to the finger members.

9. A method as recited in claim 8 comprising the further step of:

separating at least a few of the pieces in the flowstream with respect to one another prior to the step of drawing a few of the pieces through the space between the finger members.

10. A method as recited in claim 9 wherein the steps of removing pieces from the collection, establishing a flowstream of pieces, transporting pieces to the finger members, and drawing pieces through the finger members, are achieved by moving a blade member relative to the plurality of stationarily positioned finger members, the blade member comprising a plurality of spaced-apart finger members operatively projecting therefrom to pass in the spaces between the stationarily positioned finger members.

11. A method of changing sheets of garneted polyester fiber into rounded bodies suitable for blow injecting as insulation into a pocket formed in goods for receiving the insulation, comprising the steps of;

providing at least one sheet of garneted polyester fiber material,
separating each sheet of fiber material into a plurality of pieces,
establishing a flowstream of the separated pieces,
providing a plurality of stationarily positioned projection members, said projection members providing a plurality of spaces therethrough, and
impacting at least a few of the pieces within the flowstream onto the projection members and into the spaces through the projection members until at least a few of the pieces become rounded bodies.

12. A method as recited in claim 11 comprising the further step of:

periodically drawing at least a few of the pieces from the flowstream through the spaces provided by the projection members.

13. A method as recited in claim 12 comprising the further step of:

inducing a rolling movement in at least a few of the pieces laterally with respect to the flowstream after impacting the pieces.

14. A method as recited in claim 11 comprising the further step of:

tumbling the pieces after impacting them with the projection members.

15. A method as recited in claim 11 comprising the further step of:

accumulating the pieces in a collection after impacting them with the projection members.

16. A method as recited in claim 15 comprising the further step of:

agitating the pieces in the collection.

17. A method as recited in claim 16 wherein the flowstream is established from the collection.

18. A method as recited in claim 16 comprising the further step of:

continuing the aforementioned steps until all of said pieces are generally transformed into rounded bodies of generally uniform size size sufficient for blow injecting through a blow injection path into an insulating pocket without clogging the blow injection path.

19. A method as recited in claim 8 further comprising:

positioning the finger members to define at least one V-shaped configuration, the V-shaped configuration having a point, the point of the V-shaped configuration being positioned to encounter pieces in the flowstream prior to pieces in the flowstream encountering the remaining portions of the V-shaped configuration.

20. A method as recited in claim 12 further comprising:

positioning the projection members to define at least one V-shaped configuration, the V-shaped configuration having a point, the point of the V-shaped configuration being positioned to encounter pieces in the flowstream prior to pieces in the flowstream encountering the remaining portions of the V-shaped configuration.

* * * * *